INVENTOR
F. K. BECKER
BY J. P. Kearns
ATTORNEY

United States Patent Office 3,458,815
Patented July 29, 1969

3,458,815
CONSTANT LEVEL SIGNAL TRANSMISSION WITH BAND-EDGE PILOT TONE AMPLITUDE ADJUSTMENT

Floyd K. Becker, Colts Neck, N.J., assignor to Bell Telephone Laboratories, Incorporated, Murray Hill, N.J., a corporation of New York Filed May 17, 1966, Ser. No. 550,810
Int. Cl. H04b 1/04, 7/00
U.S. Cl. 325—62 5 Claims

ABSTRACT OF THE DISCLOSURE

The transmission of multilevel digital data through compandored transmission media is facilitated by maintaining the overall signal level constant. Transmission level is continuously monitored and a proportional control signal developed thereby is fed back to adjust pilot tone energy to compensate for variations in message signal energy. The normal compandor function is thus neutralized during digital data transmission.

This invention relates to the transmission of digital data in multilevel encoded form over transmission media which restricts signals to a limited volume range to reduce interchannel interference. More particularly, the invention relates to a system for multilevel digital data transmission which is compatible with so-called compandored lines.

In my copending application Ser. No. 459,659 filed May 28, 1965 and now U.S. Patent No. 3,401,342 issued Sept. 10, 1968, I have disclosed a high speed binary digital data transmission system for transmission media of limited bandwidth. Among the many features of that system is included multilevel encoding on as my levels as sixteen. That system is intended primarily for application to leased wire, private-line voice circuits of high quality. Binary coded characters are converted therein to multilevel symbols which are in turn amplitude modulated onto a carrier wave having a frequency optimally located in the voice channel to be utilized. The bandwidth of such a voice channel is only slightly larger than the resultant symbol rate, but much less than the binary message-bit rate.

It is possible to modify the data system disclosed in my aforesaid patent application for application to lesser grade voice channels found in the switched telephone network in a straightforward manner by sacrificing at least half the maximum number of encoding levels and accommodating to a somewhat more restricted bandwidth. However, among the many types of wire, cable, and radio communication links existing in the telephone network are compandored cable carrier transmission networks. In the compandored system, coded for example as the N-carrier system, the volume range of applied signals is reduced from about 60 decibels to 30 decibels to obtain certain advantages with respect to noise and susceptibility to adjacent channel interference. By an inverse operation at receiving terminals the original volume range can readily be restored. With analog voice signals of great redundancy such compandoring detracts in no way from intelligibility. There is no such redundancy in multilevel digital data encoding and therefore compandored channels must be avoided. This, of course, is a great inconvenience and would limit the number of otherwise available communication channels that could be used for multilevel signal transmission.

It is a principal object of this invention, accordingly, to effect reliable transmission of multilevel digital data signals over compandored voice transmission channels of the public switched telephone network.

It is another object of this invention to modify a multilevel digital data signal so that it appears as a constant amplitude signal to compandored transmission channels and thereby counteracts the compandoring function of such channels.

It is still another object of this invention to adapt multilevel-encoded digital data signals to the characteristics of compandored voice channels.

According to this invention, the amount of energy in a composite vestigial-sideband signal encoding multilevel digital data modulated onto a carrier wave and accompanied by band-edge pilot tones is monitored. Through a feedback path the energy so monitored controls the level of one of the pilot tones so that the amplitude level of the composite transmitted signal is maintained substantially constant at all times.

When such a constant level signal is applied to a communication link which includes compandors, compandor operation is neutralized and counteracted. The levels of the message portion of the composite signal are therefore transmitted without confusion or disorder.

It is a feature of this invention that standard vario-losser circuits are used to control the amount of pilot tone added to the composite signal to maintain a constant amplitude level. The other band-edge pilot tone remains available to perform its function of regulating the gain of an input amplifier in a data receiving terminal.

Further objects and features of this invention will be appreciated from a consideration of the following detailed description and the accompanying drawings in which.

Figure 1:
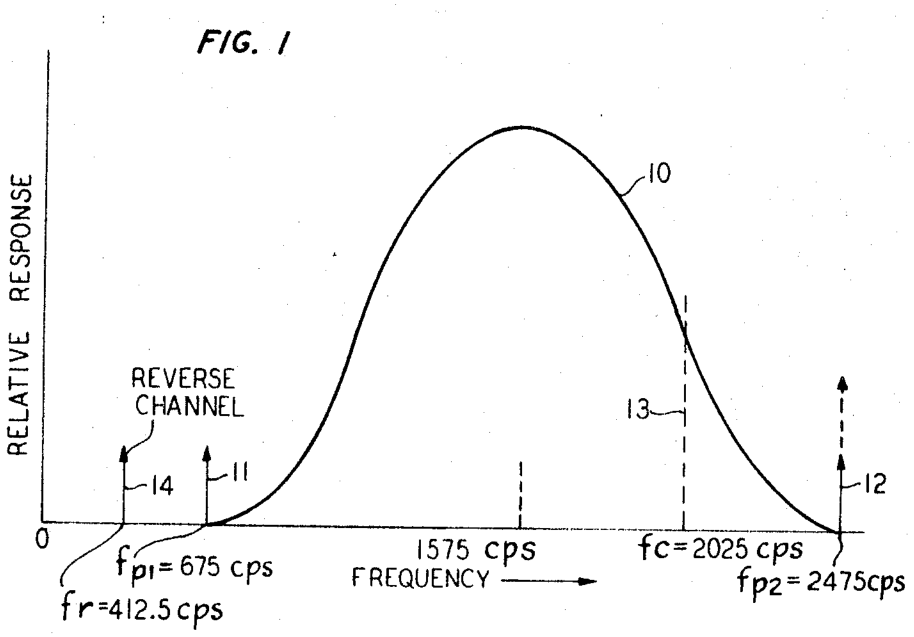
FIG. 1 is a spectrum diagram of the composite line signal accommodated in the data transmission terminal of this invention.

FIG. 1 is the frequency spectrum diagram of a vestigial-sideband signal suitable for transmitting multilevel binary digital data over a typical voice channel found in the public switched telephone network at a symbol rate of 1800 per second. For binary encoding on two levels the symbol rate is the same as the binary rate. For four-level encoding at the same symbol rate the effective binary transmission rate becomes 3600 bits per second. A maximum effective binary transmission rate of 5400 bits per second has been attained in a standard telephone voice channel using eight-level encoding.

The spectral shaping of the vestigial-sideband 10 is optimized in the raised cosine form as shown in FIG. 1. The carrier frequency $f_c$ is placed in position 13 at 2025 cycles per second. The upper and lower band edges are defined by pilot tone $f_{p2}$ of 2475 cycles at position 12 and pilot tone $f_{p1}$ of 675 cycles at position 11. Pilot tone $f_{p2}$ is shown with level adjustable in accordance with this invention. The maximum spectral component is then optimally centered in the voice band at 1575 cycles. The symbol rate is exactly the difference in frequency between the pilot tones. The carrier frequency is also available at a receiving terminal as the difference between the frequency of the upper pilot tone and one-fourth the symbol rate. The region below the lower pilot tone is available for 150 bit-per-second reverse channel supervisory signaling at a proposed frequency of 412.5 cycles per second, frequency-shifted by plus and minus 37.5 cycles per second. The frequencies specified above are given by way of example only and not by way of limitation.

In order to attain the maximum signaling rate specified above a receiving terminal must include precision automatic gain control, carrier frequency phase control, automatic equalization and error control as more fully described in my previously cited patent application.

Figure 2:
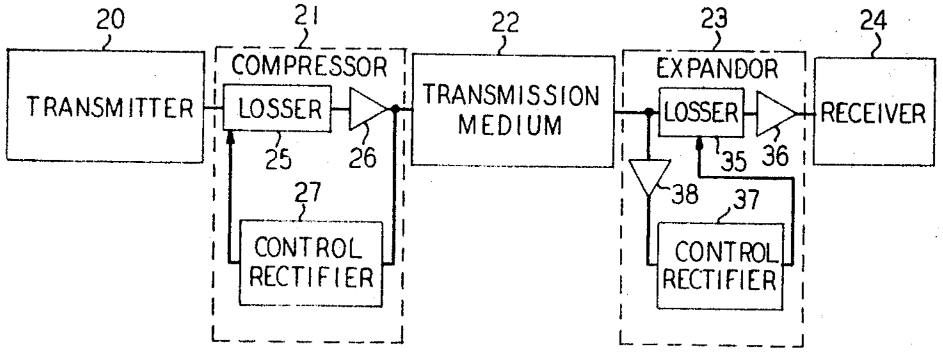
FIG. 2 PRIOR ART
FIG. 2 is a block diagram of a conventional prior art compandored transmission system.

FIG. 2 depicts in block diagram form a representative compandored transmission system for voice channels of the N-carrier type. The word compandor is a contraction of *com*pressor and ex*pandor*. The compressor 21 in a transmitting terminal compresses the input range of speech volumes originating in a transmitter 20 for passage through a transmission medium 22, typically a multipair paper-insulated cable, where a variety of noise and crosstalk interferences are commonly present. Weak speech volumes most suspectible to system disturbances are lifted and carried at a higher level over a noisy transmission medium. Stronger volumes need less increase in proportion to volume. The receiver 24 is preceded by an expandor 23 which restores the compressed speech volumes substantially to the original range. When the circuit is idle a fixed gain is introduced by the compressor and a fixed and equivalent loss by the expandor. Any noise disturbance in the transmission medium in the absence of speech is attenuated in the expandor by the fixed amount. Loss is removed from the expandor as the speech volume increases and the noise increases correspondingly.

Compressor 21 includes a losser 25, an amplifier 26 and a feedback path with a control rectifier 27. The input signal passes through losser 25, is compressed to half the input volume range and then amplified in amplifier 26. Most of the amplifier output is fed back through the control rectifier and filtered to pass only the envelope of the speech frequencies as a control signal to the losser. The filter has time constants chosen for relatively fast attack and for relatively slow decay to make the system compatible with speech syllables. However, this difference in attack and decay time constants has an unfavorable effect on data signals and results in nonlinear distortion. Moreover, the attack time constant of three to four milliseconds is slow with respect to an 1800 symbol per second transmission rate.

Expandor 23 includes a losser 35, a feedforward amplifier 38, an output amplifier 36 and a control rectifier 37. The operation of the expandor is very similar to that of the compressor except that the expandor control circuit is operated by the input speech signal amplified by amplifier 38 instead of the output speech signal. Where the compressor is backward acting, the expandor is forward acting. Control rectifier 37 includes a filter whose attack and decay times are the inverse of those in the compressor filter. However, while the tracking between the compressor and expandor filters is satisfactory for speech bursts, it is unsuited to multilevel data signals and causes undesired distortion products which confound the slicing circuits in a data receiving terminal. The purpose of this invention is to eliminate the deleterious effects of poorly tracking compandors on transmitted multilevel data signals.

Figure 3:
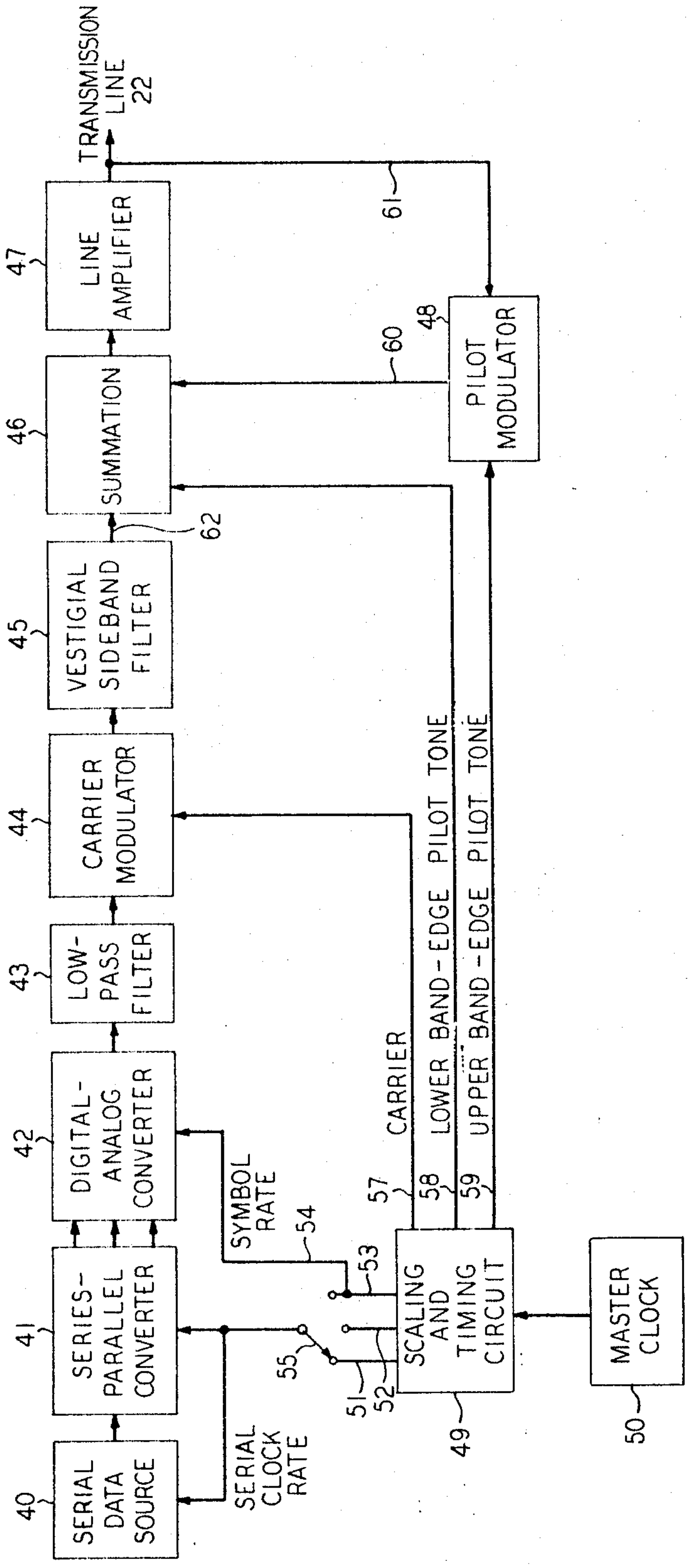
FIG. 3 is a block diagram of a data transmission terminal to which this invention is applicable.

FIG. 3 is a block diagram of a vestigial-sideband data transmitting terminal to which the anticompandor circuit of this invention is applicable. This terminal is similar in concept to that more fully disclosed in my above-cited patent application. Only the scaling and timing rates are modified to accommodate the narrower transmission bandwidth of the switched telephone network.

Serial binary data is made available to the terminal from a source 40, which may be a customer business machine or computer. These data are accepted by serial-to-parallel converter 41 to be broken into one-, two- or three-bit character groups depending on whether the illustrative transmission rate is 1800, 3600 or 5400 bits per second. Only one symbol rate of 1800 per second is permissible, of course. The parallel bits from converter 16 (in the case of two- and three-level conversion) are coupled to digital-to-analog converter 42 at the chosen symbol rate. In converter 42 an analog multilevel symbol form, including positive and negative levels, is constructed according to the scheme more fully described in my prior patent application. The output of converter 42 is passed through low-pass filter 43 to eliminate frequencies beyond the limits of the raised cosine spectrum of FIG. 1, thereby preventing fold-over distortion in the vestigial-sideband region of the spectrum.

Master clock 50 provides a precision timing signal at 22.275 kilocycles per second, the least common multiple of the carrier frequency at 2025 cycles, the upper band-edge pilot tone at 2475 cycles and the lower band-edge pilot tone at 675 cycles. Scaling and timing circuit 49 accepts the precision timing wave from clock 50 and by conventional means selects the eleventh subharmonic of the 22.275-kilocycle timing wave as the carrier frequency, the ninth subharmonic as the upper pilot tone, and the thirty-third subharmonic as the lower pilot tone. The carrier wave and lower and upper pilot tones are made available on leads 57 through 59 as shown in FIG. 3. In addition, scaling and timing circuit 49 takes the difference frequency between the upper and lower pilot tones as the symbol rate and makes it available on leads 53 and 54. The second and third harmonics of the symbol rate are presented on leads 51 and 52.

Lead 54 is permanently connected to digital-to-analog converter 42 to provide the symbol rate of 1800 per second thereto. Leads 51, 52 and 53 connect to a selector switch having a selecting arm 55. By setting arm 55 to one of the terminals of leads 51, 52 or 53 a serial clock synchronizing signal of 5400, 3600 or 1800 cycles per second is furnished to serial data source 40 and to serial-to-parallel converter 41 for control purposes.

The carrier wave on lead 51 in FIG. 3, applied to carrier modulator 44, translates the multilevel data signals in the output of low-pass filter 43 to the upper end of the voice-frequency band. Vestigial-sideband filter rejects the major portion of the upper sideband and produces the raised cosine spectral envelope shown as curve 10 in FIG. 1. The output of filter 45 on lead 62 is coupled to a summation circuit 46, where it is combined in a linear adder directly with the lower band-edge pilot tone at 675 cycles on lead 58 and with the upper band-edge pilot tone on lead 60 as controlled according to this invention.

The composite signal in the output of summation circuit 46, which includes the raised cosine-shaped, vestigial-sideband data portion 10 of FIG. 1 and the two pilot $f_{p1}$ and $f_{p2}$, is amplified to a standard transmission level in line amplifier 47 and is applied to transmission line 22. A hybrid circuit (not shown) may be included in transmission line 22 to couple and decouple reverse channel supervisory signals from the line in a well known way not forming part of this invention.

According to this invention a portion of the output signal from line amplifier 47 is taken by way of lead 61 to pilot modulator 48, which also receives on another input from lead 59 the upper band-edge pilot tone at 2475 cycles per second. In pilot modulator 48 the input on lead 61 is rectified to form a control signal for a vario-losser therein. The output on lead 60 is a signal at the upper pilot-tone frequency whose energy, when added to that of the data signal portion and lower pilot tone, makes the amplitude level at the output of amplifier 47 substantially constant. The energy in the data portion of the composite line signal is left free to vary according to the nature of the message being transmitted, while the constant amplitude of the total signal will defeat compandor action in carrier systems found in transmission line 22 for a given call set-up.

Figure 4:
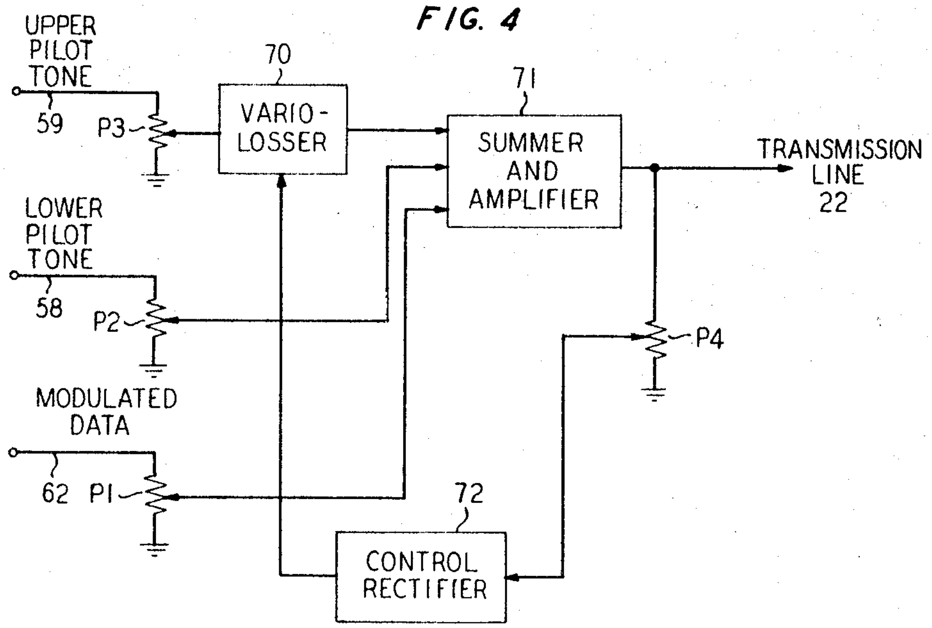
FIG. 4 is a block diagram of the anticompandor pilot-tone insertion system of this invention.

FIG. 4 illustrates in simplified form the arrangement for modulating the upper pilot-tone frequency to afford a constant-level output signal on transmission line 22. The arrangement of FIG. 4 comprises vario-losser 70, control rectifier 72 and adjustment potentiometers P1 through P4. Summer 71 is a composite of summation circuit 46 and line amplifier 47 in FIG. 3. Modulated data on lead 62, lower pilot-tone signal on lead 58 and upper pilot-tone signal on lead 59 have their initial levels established by adjustment of potentiometers P1 through P3 in optimum ratios as determined empirically by the requirements of the average telephone-grade transmission medium for a random data signal. Potentiometer P4 provides a similar adjustment of the portion of the output of summer 71 to be fed back as a control signal. The portion of the output signal thus fed back is rectified in control rectifier 72 and applied to vario-losser 70. Vario-losser 70 is thereby made to vary its attenuation of the upper pilot tone in proportion to the level of the output signal and therefore to maintain the output signal level substantially constant.

Figure 5:
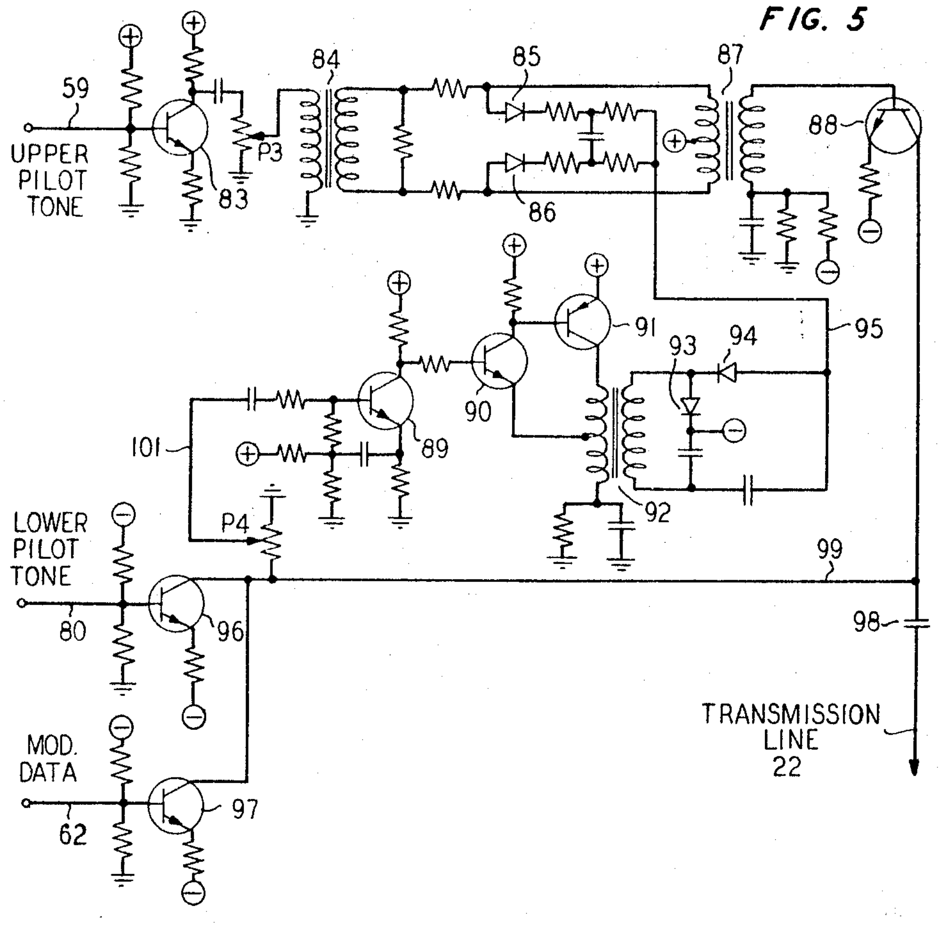
FIG. 5 is an illustrative embodiment of the pilot-tone anticompandor control circuit of this invention.

FIG. 5 shows in more detail the circuit of an illustrative embodiment of pilot modulator indicated in FIGS. 3 and 4. The upper pilot tone is applied on lead 59 directly from scaling and timing circuit 49 in FIG. 3. The lower pilot tone, also from scaling and timing circuit 49, appears on lead 80 after passing through an isolating emitter-follower circuit (not shown). Modulated data on lead 62 is received from vestigial-sideband filter 45 in FIG. 3. An isolating emitter follower (not shown) for buffering purposes is also advantageous here. Each of these signals is initially amplified in linear transistor amplifiers 83, 96 and 97. The resistive voltage dividers at the base electrodes provide proper bias for linear operation. Each transistor has an emitter resistor connected to a point of negative potential. Transistor 83 has its own collector resistor as shown. Transistors 96 and 97 share potentiometer P4 as their common collector load.

The amplified upper pilot tone signal at the collector of transistor 83 is applied through a coupling capacitor as shown to potentiometer P3. A selected amount from potentiometer P3 drives transformer 84. Between transformer 84 and 87 is situated a vario-losser including voltage-variable diodes 85 and 86. These diodes are in shunt of the transmission path between the secondary winding of transformer 84 and the primary winding of transformer 87. Resistive padding is included in the transmission path as shown. Diodes 85 and 86 are poled toward each other through a balanced T-network as shown to provide the proper shunting impedance. A center tap on the primary winding of transformer 87 is connected to a positive potential source. The junction of the T-network is connected to lead 95 for control purposes. A variable negative potential is supplied to lead 95 in the control rectifier as explained below.

The attenuated signal across the secondary winding of transformer 87 is amplified in transistor 88, which is a linear amplifier by virtue of the bias supplied to its base circuit in the conventional manner shown in FIG. 5. The amplified output signal at the collector of transistor 88 appears across potentiometer P4 by way of lead 99. The full composite line signal thus appears across potentiometer P4.

A selected portion of this composite signal is applied by way of lead 101 through the capacitor shown to the input of a three-stage amplifier comprising transistors 89, 90 and 91. Transistor 89 is connected as a common-emitter amplifier with a slight amount of stabilizing negative feedback wherein the emitter is capacitively coupled back to the base electrode. Transistors 90 and 91 are of opposite conductivity types and are connected to provide phase inverted inputs to the primary of transformer 92. In the secondary circuit of transformer 92 a voltage-doubling rectifier circuit including diodes 93 and 94 acts as a detector and effectively strips the envelope from the composite line signal and furnishes a corresponding varying negative voltage to lead 95. This voltage then acts on the vario-losser diodes 85 and 86 to vary their effective shunting resistance according to the level of the composite signal. Thus, as the level of the composite signal falls more upper pilot tone energy is inserted and the reverse also occurs. The compoiste line signal therefore tends to maintain a constant amplitude level regardless of fluctuations in the data portion of the signal. The composite line signal is coupled to transmission line 22 by way of capacitor 98.

It is apparent that the lower pilot tone can also be modulated by the level of the line signal in the same say, if desired, according to the principles of this invention.

At a receiver for the composite line signal shown in FIG. 1 the upper and lower pilot tones are picked off and intermodulated to reconstruct a demodulating carrier wave and timing signals. The lower pilot tone so separated is available to regulate an automatic gain control amplifier because its level has not been changed in the pilot tone modulator. The upper pilot tone level as received is immaterial because only its frequency is required to reconstruct the demodulating carrier. Any compandored carrier systems traversed on the transmission line will have been effectively neutralized.

While this invention has been described in terms of a specific illustrative embodiment, numerous modifications thereof will occur to those skilled in the art without departing from the principles disclosed herein and within the scope of the following claims.

What is claimed is:

1. In combination with a compandored transmission medium and a multilevel data transmision system having a source of band-edge pilot tones and a source of message signals.

means for maintaining a substantially constant amplitude level in the line signal applied to said transmission medium to prevent compandor operation during data transmission comprising detector means at the input to said transmission medium monitoring the level of said line signal and generating a control signal accordingly, adjustable attenuator means in tandem with said pilot-tone source and connected independent of said message-signal source, and feedback means between said detector and attenuator means controlling the compensatory insertion of pilot-tone energy into said line signal.

2. The combination set forth in claim 1 in which said adjustable attenuator means is a diode vario-losser.

3. The combination set forth in claim 1 in which said adjustable attenuator means operates on one only of the band-edge pilot tones from said pilot-tone source.

4. The combination set forth in claim 1 in which said detector means comprises:

a linear amplifier operating on said line signal including modulated data and pilot-tone components, and a voltage-doubler circuit full-wave rectifying the output of said amplifier to form a varying direct-current control signal for said attenuator in accordance with the level of said line signal.

5. In combination with a transmision medium including means for compressing the volume range of analog signals traversing it and a multilevel vestigial-sideband data transmission system generating a composite line signal including a data region and upper and lower band-edge pilot tones from which carrier frequency and data symbol rates can be reconstructed, said composite multilevel line signal being normally rendered unintelligible by passing through said transmission medium, anticompandor means for defeating the operation of rendered unitelligible by passing through said transmission comprising a vario-losser operating on one of said pilot tones, a summation circuit combining into said composite line signal data signal and upper and lower pilot-tone energy, a control rectifier responsive to said composite line signal generating a control signal corresponding to the level of said composite line signal, and means applying said control signal to said vario-losser to maintain said composite line signal at a substantially constant overall amplitude level without interfering with the varying amplitude level of said data region.

References Cited

UNITED STATES PATENTS

| | | | |
|---|---|---|---|
| 2,965,717 | 12/1960 | Bell | 325—62 X |
| 3,112,462 | 11/1963 | De Jager et al. | 333—14 |

| | | | |
|---|---|---|---|
| 3,241,066 | 3/1966 | Ligotky | 333—14 X |
| 3,271,679 | 9/1966 | Fostoff | 325—62 X |

ROBERT L. GRIFFIN, Primary Examiner

W. S. FROMMER, Assistant Examiner

U.S. Cl. X.R

325—42; 333—14, 16